United States Patent
Abdulhalim et al.

(10) Patent No.: US 10,146,094 B2
(45) Date of Patent: Dec. 4, 2018

(54) TUNABLE ACHROMATIC WAVEPLATES

(71) Applicants: Ibrahim Abdulhalim, Wahat-Alsalam-Neve Shalom (IL); Marwan Abu Leil, Ein Mahel (IL)

(72) Inventors: Ibrahim Abdulhalim, Wahat-Alsalam-Neve Shalom (IL); Marwan Abu Leil, Ein Mahel (IL)

( * ) Notice: Subject to any disclaimer, the term of this patent is extended or adjusted under 35 U.S.C. 154(b) by 0 days.

(21) Appl. No.: 14/818,443

(22) Filed: Aug. 5, 2015

(65) Prior Publication Data
US 2016/0048049 A1    Feb. 18, 2016

Related U.S. Application Data

(60) Provisional application No. 62/038,273, filed on Aug. 17, 2014.

(51) Int. Cl.
*G02F 1/1347* (2006.01)
*G02F 1/139* (2006.01)
*G02B 5/30* (2006.01)

(52) U.S. Cl.
CPC ....... *G02F 1/13471* (2013.01); *G02B 5/3083* (2013.01); *G02F 1/1393* (2013.01)

(58) Field of Classification Search
CPC .... G02F 1/216; G02F 1/13471; G02F 1/1393; G02B 6/3083
See application file for complete search history.

(56) References Cited

U.S. PATENT DOCUMENTS

| | | | | |
|---|---|---|---|---|
| 5,592,314 | A * | 1/1997 | Ogasawara | G02F 1/13473 349/114 |
| 6,141,069 | A * | 10/2000 | Sharp | G02B 5/3016 349/18 |
| 6,380,997 | B1 * | 4/2002 | Sharp | C09K 19/0225 252/299.01 |
| 2004/0239869 | A1 * | 12/2004 | Cavanaugh | G02F 1/216 349/198 |
| 2006/0262396 | A1 * | 11/2006 | Smith | G02B 6/2713 359/489.07 |
| 2014/0362331 | A1 * | 12/2014 | Shi | G02F 1/13363 349/117 |

OTHER PUBLICATIONS

S. Pancharatnam, Proc. Indian Acad. Sci. 41A, 137-144 (1955).
J. B. Masson and G. Gallot, Optics Letters, vol. 31, No. 2, (2006).
Saha, K. Bhattacharya and A. K. Chakraborty, Optical Engineering 50(3), 034004 (2011).

(Continued)

*Primary Examiner* — Jessica M Merlin
(74) *Attorney, Agent, or Firm* — The Roy Gross Law Firm, LLC; Roy Gross

(57) ABSTRACT

The invention is a tunable achromatic wave plate comprised of two or more retarders made of electrooptic or magnetooptic materials arranged at different orientations with respect to each other and at least one voltage source configured to tune the retardation dispersion of each of the retarders by applying an external electric or magnetic field to each retarder separately. Also described are examples of optical systems in which the invention can be employed.

15 Claims, 6 Drawing Sheets

(56) References Cited

OTHER PUBLICATIONS

Saha, K. Bhattacharya and A. K. Chakraborty, Optical Engineering 51(1), 013001 (Jan. 2012).
Saha, K. Bhattacharya and A. K. Chakraborty, Applied Optics, vol. 51, No. 12, (2012).
S. Shen, J. She, and T. Tao, J Opt Soc Am. A, vol. 22, No. 5 (2005).
H. Kikuta, Y. Ohira, and K. Iwata, Applied Optics. vol. 36, No. 7. (1997).
G. P. Nordin and P. C. Deguzman, Optics Expres, vol. 5, No. 8, (1999).
K. Guo-Guo, T. Qiao-Feng, and J. Guo-Fan, Chin Phys Lett, vol. 26, No. 7 (2009).
G. Kang, Q. Tan, X. Wang and G. Jin, Optics Express, vol. 18, No. 2, (2010).
R. M. A. Azzam and C. L. Spinu, J. Opt. Soc. Am A, vol. 21, No. 10, (2004).
Abdulhalim, R. Moses and R. Sharon, Acta Physica Polonica A, No. 5, vol. 112 (2007).
M. Wahle and H. S. Kitzerow, Optics Express, vol. 22, No. 1, (2014).
Abdulhalim and D. Menashe, Liquid Crystals, vol. 37, No. 2, 233-239 (2010).
Abdulhalim, Continuous Phase-Only or Amplitude Light Modulation using Ferroelectric Liquid Crystals with Fixed Boundary Orientations, Optic Communi, 108, 219 (1994).
Miri Gelbaor Kirzhner, Matvey Klebanov, Victor Lyubin, Neil Collings, and I. Abdulhalim, High resolution optically addressed spatial light modulator based on nematic liquid crystal and nanodimensional chalcogenide glass photosensor, Optics Letters 39, 2048 (2014).

* cited by examiner

US 10,146,094 B2

TUNABLE ACHROMATIC WAVEPLATES

FIELD OF THE INVENTION

The invention is from the field of optics. Specifically the invention relates to the design of tunable achromatic wave plates.

BACKGROUND OF THE INVENTION

Publications and other reference materials referred to herein are numerically referenced in the following text and respectively grouped in the appended Bibliography which immediately precedes the claims.

Achromatic wave plates are key components in many instruments and optical systems particularly in polarization control. Due to the importance of these components many investigators have presented various designs for achromatic quarter wave plates (AQWP) and achromatic half wave plates (AHWP) based on various optical principles [1-11].

A cascade of two or more crystalline wave plates is a popular approach to design achromatic wave plates, while the wave plates in the cascade can be produced from the same or different materials with specific thickness and optical axis orientation of each one. The design of an achromatic wave plate in the visible range (using mica) formed from a combination of three retarders of the same material was proposed by Pancharatnam [1], in which the first and the third retarder are identical (thickness and orientation) while the one between has a specific thickness and orientation. For the terahertz region, a design composed of six retarders was presented in ref [2]. Saha et al [3,4,5] presented different AQWP designs using crystalline quartz plates. The first design is a combination of three plates that can operate as AQWP and AHWP in the near infrared region by changing the orientation of the middle plate; the other two designs present an AQWP in the 500-700 nm region while one of them composed from four plates and the last from two plates.

Two twisted nematic liquid crystal retarders were also used to demonstrate an AQWP [6] in the visible range and compared with the three element Pancharatnam's type achromatic design. A design of AQWP was proposed using subwavelength grating structures (SWG) based on their form birefringence [7]. The first physical implementation of the form birefringence of gratings as quarter wave plate was reported for the mid-infrared region [8]. Later an optimization for angle-insensitive design based on SWG was described [9] and an IR dual band AQWP (MWIR and LWIR) designed from a combination of four SWG's [10]]. The main limitation in this concept is the difficult fabrication especially in the visible and the IR region. The total internal reflection in the surface of Si—SiO$_2$ was used also to design an AQWP in the near and mid-infrared regions [11] while the limitation on this approach is the voluminous system comparatively.

It is a purpose of the present invention to provide a new design of achromatic wave plates based on two or more retarders made of electrooptic or magnetooptic materials.

Further purposes and advantages of this invention will appear as the description proceeds.

SUMMARY OF THE INVENTION

In a first aspect the invention is a tunable achromatic wave plate comprised of two or more retarders made of electrooptic or magnetooptic materials arranged at different orientations with respect to each other and at least one voltage source configured to tune the retardation dispersion of each of the retarders by applying an external electric or magnetic field to each retarder separately.

In embodiments of the tunable achromatic wave plate of the invention at least two of the two or more retarders are made of different electrooptic or magnetooptic materials.

In embodiments of the tunable achromatic wave plate of the invention at least one of the retarders is made of liquid crystal material. In these embodiments the material or mode of the liquid crystal material can be chosen from the group comprising: nematic, twisted nematic, vertically aligned, ferroelectric, cholesteric, hybrid aligned, chiral liquid crystals, flexoelectric, dual mode, and in-plane.

Embodiments of the tunable achromatic wave plate of the invention can be comprised of two different retarders oriented with their optic axis perpendicular to each other and with the incident light polarized at 45 degrees to the optic axis of the first retarder.

In embodiments of the tunable achromatic wave plate of the invention the spectral range over which the wave plate operates is tuned by changing the tilt angles of the retarders with respect to each other.

In embodiments of the tunable achromatic wave plate of the invention the spectral range over which the wave plate operates is tuned by changing the voltage applied to each of the retarders.

In embodiments of the tunable achromatic wave plate of the invention at least one of the retarders is a liquid crystal device having an alignment layer comprising a subwavelength grating.

In embodiments of the tunable achromatic wave plate of the invention at least one of the retarders is comprised of pixels, thereby allowing the tunable achromatic wave plate to operate as an achromatic spatial light modulator.

In embodiments of the tunable achromatic wave plate of the invention at least one of the retarders is comprised of an optically addressed spatial light modulator, thereby allowing the external field to be controlled by light.

In embodiments of the tunable achromatic wave plate of the invention the tunable achromatic wave plate operates between two polarizers acting as an achromatic intensity switch.

In embodiments of the tunable achromatic wave plate of the invention the first retarder is configured to act as a variable retarder and the second retarder is configured to act as a quarter wave plate; thereby causing the output of the tunable achromatic wave plate to act as a wavelength independent polarization rotator.

In a second aspect the invention is an achromatic phase generator for a polarimetric imaging system composed of two tunable achromatic wave plates of the first aspect of the invention.

In embodiments of the tunable achromatic wave plate of the second aspect of the invention the first achromatic wave plate is configured to operate as an achromatic full wave plate, the second achromatic wave plate is configured to operate as one of an achromatic quarter, half, or full wave plate, and the output of the phase generator is Right circular polarization, linear Vertical polarization, or linear Horizontal polarization respectively.

In embodiments of the tunable achromatic wave plate of the second aspect of the invention the first achromatic wave plate is configured to operate as an achromatic quarter wave plate, the second achromatic wave plate is configured to operate as an achromatic half wave plate, and the output of the phase generator is Left circular polarization.

An achromatic phase generator for a phase shift orthogonally polarized low coherence interferometry system composed of the tunable achromatic waveplate of the first aspect of the invention placed after the output of an orthogonally polarized interferometry system to generate achromatic phase shift between two interfering beams of the interferometry system.

All the above and other characteristics and advantages of the invention will be further understood through the following illustrative and non-limitative description of embodiments thereof, with reference to the appended drawings.

DETAILED DESCRIPTION OF EMBODIMENTS OF THE INVENTION

The invention is a new design of achromatic wave plates (AWP) based on two or more retarders made of electrooptic or magnetooptic materials such as liquid crystals. The AWPs of the invention operate as tunable achromatic quarter wave plates (AQWP), tunable achromatic half waveplates (AHWP) and tunable achromatic full wave plates (AFWP) by applying different voltages on each retarder over wide spectral bands. The novelty in the invention is to control the retardation dispersion by applying a suitable external field (electric or magnetic) to each retarder separately.

Although the invention applies to the use of many types of electrooptic or magnetooptic materials, the description herein concentrates on liquid crystals for illustration purposes. Liquid crystals are birefringent materials which respond to small applied electric and magnetic fields. Hence the phase retardation of an optical wave propagating through them can be easily controlled. In many cases the effective extraordinary refractive index $n_e$ depends both on the refractive index parallel $n_\|$ to the molecular axis and perpendicular to it $n_{s\perp}$ as well as on the orientation angles of the LC molecules. Since the orientation angles of the LC molecules are voltage dependent, the effective birefringence and its dispersion will then be voltage dependent. By combining two or more LC devices together it is possible then to find voltage combinations at which the retardation dispersion of one device is compensated by that of the other devices. Hence an achromatic waveplate can be built by simply choosing the appropriate voltages applied. Achromatic operation at different spectral ranges is also possible by simply changing the combination of the applied voltages. This is the essence of the present invention. Many LC modes and materials can be used for this purpose, however for a detailed description the description of the invention herein concentrates first on nematic LC retarders.

Figure 1A:
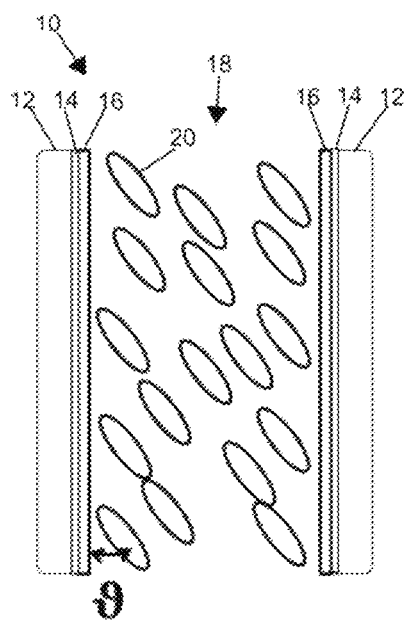
FIG. 1a schematically shows the structure of a nematic LC cell with anti-parallel alignment.

The structure of a nematic LC cell with anti-parallel alignment at zero voltage is shown in FIG. 1a, where the applied electric field is along the z axis. The cell 10 is built in a typical layered structure. From side to side the layers are: glass 12, indium tin oxide (ITO) 14, alignment layer 16, LC material 18 comprised of LC molecules 20, alignment layer 16, ITO 14 and glass 12. The layers are transparent. The ITO layers are conductive so applying the voltage drop between them imposes an electrical field on the LC material. The LC molecules with positive dielectric anisotropy tend to align parallel to the electric field, and as a result the angle $\vartheta$ changes [12] thus changing the effective extraordinary refractive index and the retardation of the cell.

Figure 1B:
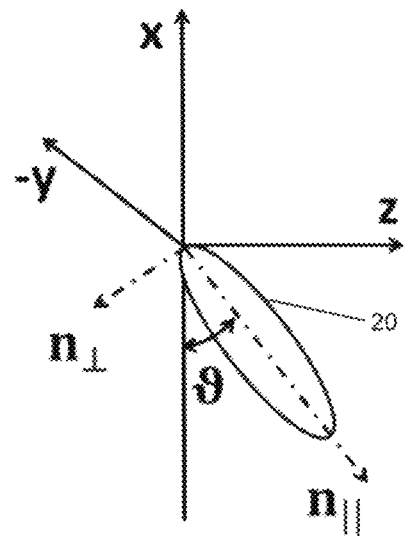
FIG. 1b schematically shows the LC molecule and geometry of the optical axes.

FIG. 1b schematically shows the LC molecule and geometry of the optical axes. Assuming a uniform $\vartheta$ profile along the cell, the retardation of each LC cell of thickness d is calculated by: $\Gamma = 2\pi \Delta n d/\lambda$, while the birefringence dependence on $\vartheta$ is:

$$\Delta n = n_e - n_o = \frac{n_\perp n_\|}{\sqrt{n_\|^2 + (n_\perp^2 - n_\|^2)\cos^2(\vartheta)}} - n_\perp \quad (1)$$

Because of the anchoring of the molecules at the two boundaries, as the external field is applied a non-uniform profile of the tilt angle distribution $\vartheta(z)$ arises and therefore the total retardation accumulated by the waves after passing through the device is given by the integral:

$$\Gamma = (2\pi/\lambda)\int_0^d (n_e(\vartheta(z)) - n_\perp)\,dz. \quad (2)$$

Figure 1C:
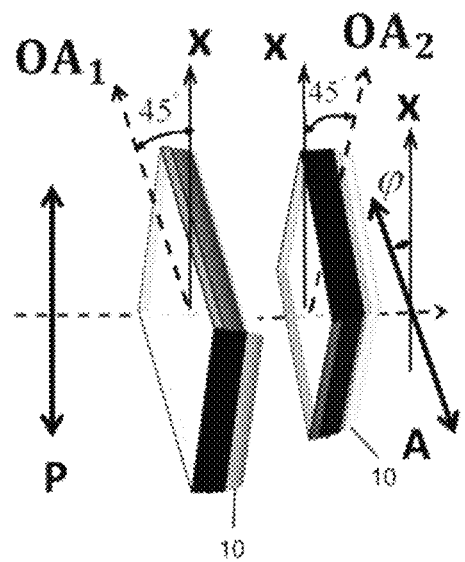
FIG. 1c schematically shows the device of the invention between two polarizers.

FIG. 1c schematically shows the device of the invention, which is composed of two nematic LC cells 10 with anti-parallel alignment oriented at 90 degrees to each other. Incident light—represented by the broken arrow—is travelling along the z axis. Also shown are a polarizer—represented by the double headed arrow P—in front of the first LC cell and an analyzer—represented by the double headed arrow A—after the second LC cell that are not part of the device but are part of the experimental setup used for making measurements with the device. The optic axis of the first retarder is at 45 degrees to the polarizer axis. The Jones matrices represent a system which consists of a linear polarizer (at 0 degree with the x axis), the achromatic device composed from the two cells is arranged so that the optic axis of the first cell is at 45 degrees with respect to the polarizer P or the x-axis while the optic axis of the second cell is at −45 degrees with respect to the x-axis and the analyzer A is at an arbitrary orientation $\varphi$ with the x-axis:

$$J_{out} = \quad (3)$$

$$J_{in} = \begin{pmatrix} 1 \\ 0 \end{pmatrix}$$

$$A(\varphi)Ret_2(-45)Ret_1(45)J_{in} \Longrightarrow J_{out} = A(\varphi)\begin{pmatrix} \cos((\Gamma_1 - \Gamma_2)/2) \\ -i\sin((\Gamma_1 - \Gamma_2)/2) \end{pmatrix}$$

Here $J_{in}$ represents the incident light after the polarizer, $A(\varphi)$ the analyzer matrix at angle $\varphi$ with respect to the polarizer, $Ret_1$ and $Ret_2$ represent the matrices for the two retarders composing the device and $\Gamma_1$, $\Gamma_2$ are their retardations respectively. In the case of crossed polarizers ($\varphi=\pi/2$) the transmission of the system is $\sin^2((\Gamma_1-\Gamma_2)/2)$ and $\cos^2((\Gamma_1-\Gamma_2)/2)$ in the case of parallel polarizers ($\varphi=0$).

Under the condition of $\Gamma_1-\Gamma_2=\pi/2+m\pi$ (m is an integer) the device operates as a QWP and the transmission of the system equals to 50% regardless of the angle of the analyzer ($\varphi$). On the other hand the device operates as a HWP under the condition of $\Gamma_1-\Gamma_2=(2m+1)\pi$. In this case the transmission equals to 100% in the case of crossed polarizers and 0% for the case of parallel polarizers. The device operates as a full waveplate (FWP) under the condition $\Gamma_1-\Gamma_2=2\pi m$. In this case the transmission equals 0% in the case of crossed polarizers and 100% for the case of parallel polarizers.

In the existing designs of achromatic waveplates the dispersion of each retarder is chosen so that the wavelength dependence is compensated at certain thicknesses to operate as AQWP, AHWP or AFWP. In the device of the invention the voltage is used to tune the dispersion of the retardation of each retarder to obtain such compensation.

Figure 2:
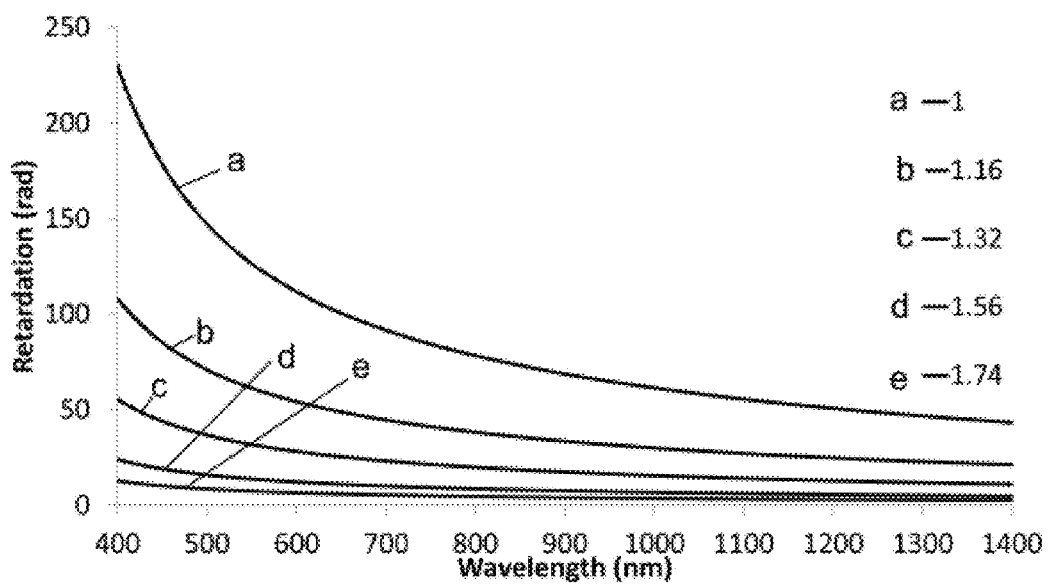
FIG. 2 shows retardation vs. wavelength of an E7 LC cell for different voltages.

As it is evident from equation (1), it is not only that the retardation that varies with the voltage but also its wavelength dependence (dispersion) as can be seen in the results of a simulation shown in FIG. 2. Hence by choosing two retarders made of two different LC materials and applying different voltages one is able to obtain achromatic behavior over a wide spectral band which is tunable with the voltages applied. This is the basis of the invention.

A simulation of the retarders based on equation 1 has been performed using two different ideal nematic LC cells: the first uses Merck BL036 LC material with thickness of 27.23 μm and the second uses Merck E7 LC material with thickness of 49.51 μm. The retardation was calculated using $\Gamma=2\pi\Delta nd/\lambda$ and equation 1 while the coefficients of Cauchy equation for the refractive indices of the liquid crystals were taken from ref [13]. The change in the applied voltage is expressed in the simulation by changing the tilt angle ($\vartheta$) of the molecules which causes a change of the birefringence (equation 1), or the retardation. An assumption of uniform $\vartheta$ profile along the cells is considered to simplify the simulation but then in order to calculate the appropriate voltages needed to achieve the required retardations, the nonuniform profiles of $\vartheta$ and their voltage dependence were considered as will be discussed below. The results of the simulation showing the retardation as a function of wavelength of the cell with E7 LC material for voltages a-e (volts) are shown in FIG. 2.

Figure 3:
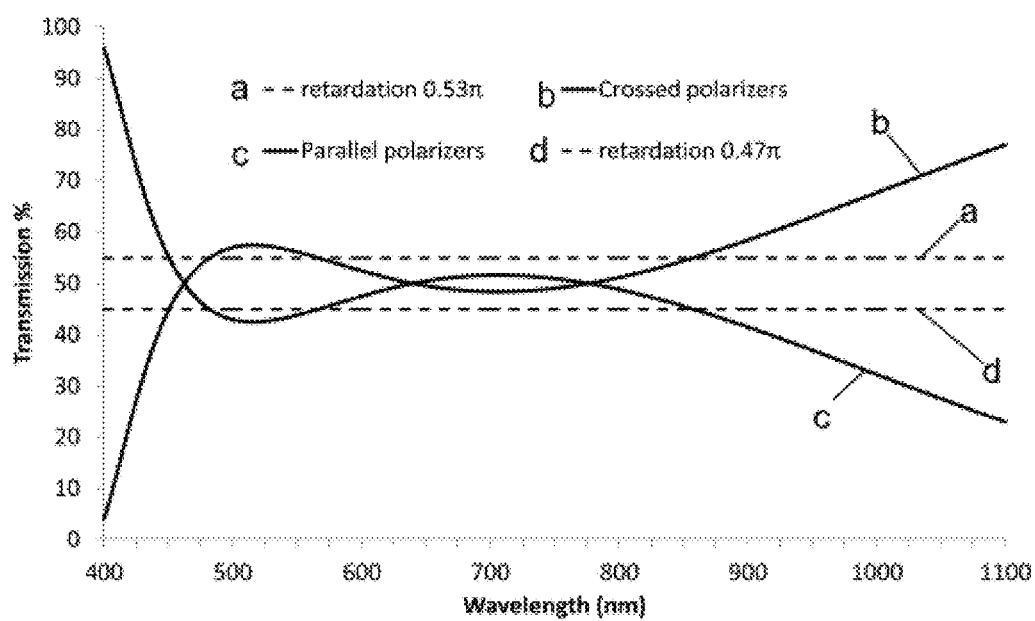
FIG. 3 to FIG. 5 show the simulated transmission of an embodiment of the device of the invention between crossed and parallel polarizers for different values of tilt angle of the LC retarders, i.e. different voltages.

FIG. 3 shows one simulation in which the device operates as an AQWP with variation of 5% in transmission ($\pm 0.03\pi$ in retardation) in the wavelength region of 570-860 nm, when the first LC retarder with tilt angle of $\vartheta=2$ degrees while the second LC retarder with tilt angle of $\vartheta=29.91$ degrees.

Figure 4:
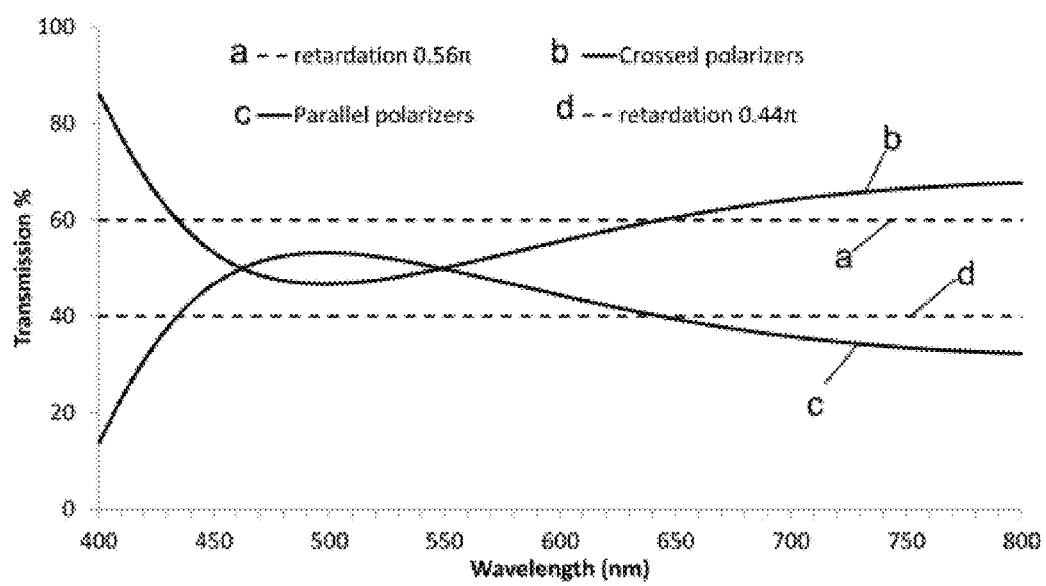

The possibility to tune the region of the AQWP to a different range by setting different pair of tilt angles (equivalently applying a different pair of voltages) in the same device is shown in FIG. 4. Changing the tilt angle for the BL036 LC retarder to 35 degrees and the tilt angle for the E7 LC retarder to 46.26 degrees tunes the achromatic QWP to the wavelength region 435-645 nm with transmission variation of 10% ($\pm 0.06\pi$ variation in retardation).

Figure 5:
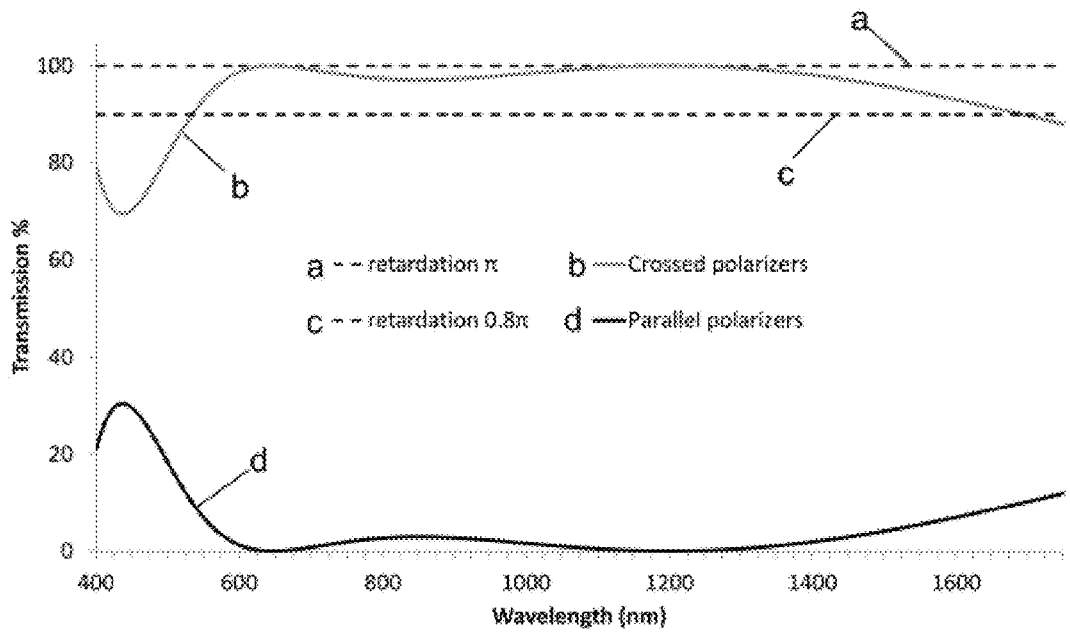

In addition to the tunable AQWP, an AHWP can be achieved from the same device by another pair of tilt angles. FIG. 5 shows the experimentally measured transmission of the same device as in FIG. 3 and FIG. 4 with tilt angle for the BL036 LC of 2 degrees and 30.85 degrees for the E7 LC retarder showing that it operates as an AHWP in the range 535-1690 nm.

Assuming a uniform profile means that all the molecules along the cell have the same tilt angle. The dependence of the tilt angle in the middle of the cell to the applied voltage under fixed boundary conditions may be described by [14]:

$$\vartheta_m = \vartheta_0 + (\pi/2-\vartheta_0)\sqrt{1-1/V_r^2} \qquad (4)$$

Here $V_r$ is the voltage normalized to the Frederick's threshold voltage, and $\vartheta_m \approx \vartheta_0$ at the threshold voltage. The values of the voltages from equation 4 are inaccurate because of the assumption of a uniform profile of $\vartheta$. Equations 4 and 5 give more accurate expression for $\vartheta$ profile [14], for small angles ($\vartheta_m$) up to 30°:

$$\vartheta(z_r) \approx \vartheta_b(V_r) + (\vartheta_m(V_r) - \vartheta_b(V_r)) \left[ \frac{\arctan\left(\exp\left(\frac{z_r}{\chi_r}\right)\right) + \arctan(\exp((1-z_r)/\chi_r)) - \arctan\left(\exp\left(\frac{1}{\chi_r}\right)\right) - \frac{\pi}{4}}{2\arctan\left(\exp\left(\frac{0.5}{\chi_r}\right)\right) - \arctan\left(\exp\left(\frac{1}{\chi_r}\right)\right) - \frac{\pi}{4}} \right] \qquad (5)$$

and equation 6 describes the profile for $\vartheta_m > 30°$:

$$\vartheta(z_r) \approx \vartheta_b(V_r) + (\vartheta_m(V_r) - \vartheta_b(V_r)) \left[ \frac{\arctan\left(\exp\left(\frac{z_r}{\chi_r}\right)\right) + \arctan(\exp((1-z_r)/\chi_r)) - \arctan\left(\exp\left(\frac{1}{\chi_r}\right)\right)}{2\arctan\left(\exp\left(\frac{0.5}{\chi_r}\right)\right) - \arctan\left(\exp\left(\frac{1}{\chi_r}\right)\right)} \right] \qquad (6)$$

Here $z_r = z/d$, z in the distance across the cell and d is the thickness of the cell, $\chi_r = C/\pi V_r$ determines the extrapolation length near the boundaries (a layer that is difficult to switch completely).

For non-uniform $\vartheta$ profile the retardation of the cell is calculated by the following integral ($\Gamma=2\pi\Delta nd/\lambda$ not valid for this case) which is similar to that in equation 2:

$$\Gamma = 2\pi \int_0^1 (n_e(\vartheta(z_r)) - n_o) dz_r / \lambda \qquad (7)$$

For accurate design it is necessary to find the voltage that yields the suitable $\vartheta$ profile for each retarder that yields the total retardation of the device equals to odd multiples of $\pi/2$ for AQWP, odd multiples of $\pi$ for AHWP and multiple of $2\pi$ for AFWP. In principle it is possible to choose a set of voltages to obtain achromatic waveplate (AWP) at any other retardation levels and not limited to these three values, however for the demonstration we concentrate on these three cases of AQWP, AHWP and AFWP.

To demonstrate the concept two nematic LC retarders with anti-parallel alignment a device with the following design was built: the first cell is a Merck BL036 LC retarder with thickness of 27.23±0.36 μm and the second cell is a Merck E7 LC retarder with thickness of 49.51±0.2 μm.

Figure 6:
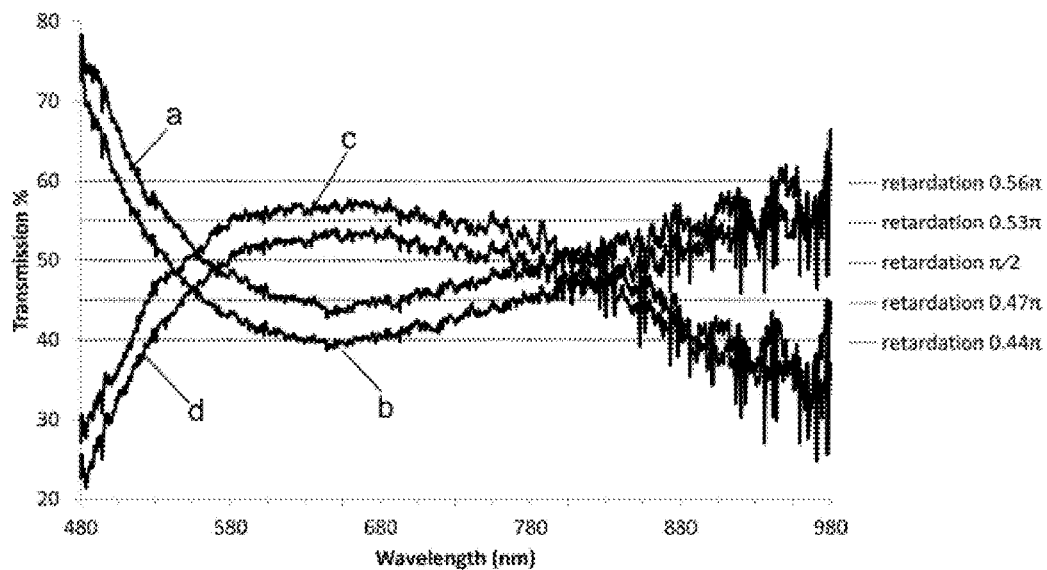
FIG. 6 to FIG. 9 show experimentally measured transmission of an embodiment of the device of the invention between crossed and parallel polarizers for different values of tilt angle of the LC retarders, i.e. different voltages.

FIG. 6 shows measured results that show that this device is operating as an AQWP in a wide range 550-830 nm with transmission variation of 5% (±0.03π variation in retardation approximately by applying voltages: V1=0V on the BL036 retarder and V2=1.704V on the E7 retarder presented by line d (crossed polarizers) and line a (parallel polarizers). The dashed lines represent the retardation levels. Applying different voltage V1=0V on BL036 cell and V2=1.703V on E7 cell presented by line c (crossed polarizers) and line b (parallel polarizers) shows that it is possible to increase the range of the AQWP to 530-880 nm but the performance has more retardation variation (±0.06π in retardation).

Figure 7:
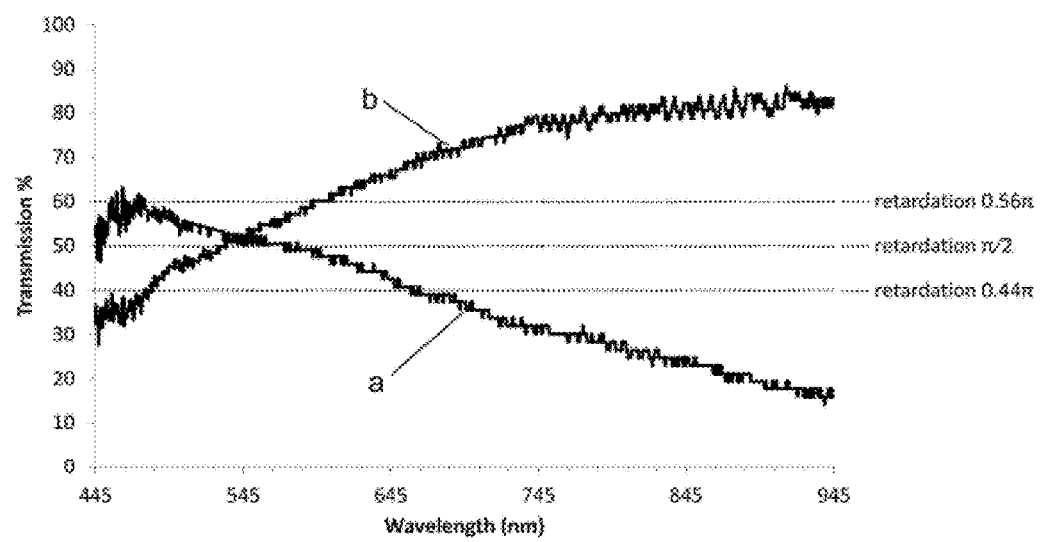

Tuning the range of the AQWP can be achieved by changing the values of the applied voltages on both cells. FIG. 7 shows the normalized transmission of the device described above operating as an AQWP in the range of 430-580 nm (±0.06π variation in retardation) with applied voltages: V1=2.6V on the BL036 cell and V2=2.8V on the E7 cell. Line a represents the case of crossed polarizers while the case of parallel polarizers is represented by line b. The dashed lines represent the retardation values. The sharp decrease in the transmission below 460 nm is due to absorption of the LC materials, the ITO and the polarizers. This is an experimental demonstration of the AQWP at different spectral range 450-650 nm using the same device.

Figure 8:
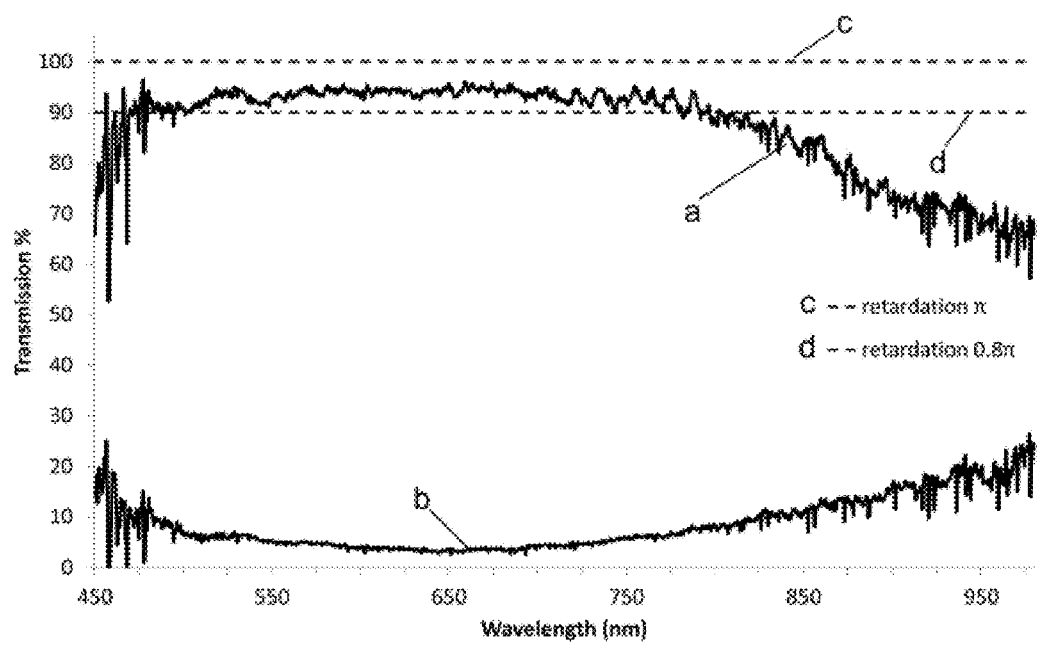

FIG. 8 shows the normalized transmission as a function of wavelength for an AHWP measured using the same device by applying voltages of: V1=0V on the BL036 cell and V2=1.681V on E7 cell. Line a represents the transmission between crossed polarizers and line b the transmission between parallel polarizers. The device operates as an AHWP in the range 460-800 nm with transmission variation up to 10%.

Figure 9:
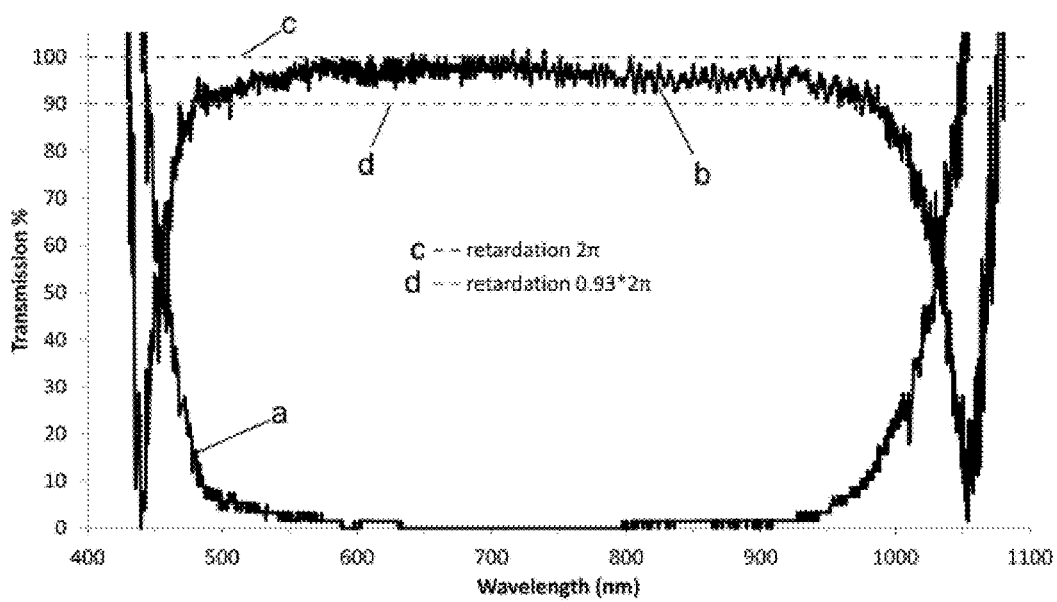

FIG. 9 shows the normalized transmission of an AFWP measured with the same device by applying voltages of: V1=3V on the BL036 cell and V2=2.58V on the E7 cell. Line a represents the case of crossed polarizers while the case of parallel polarizers is represented by line b. This is an experimental demonstration for AFWP action in the range 470-1000 nm.

It should be mentioned that although the action of the device as a tunable achromatic waveplate has been demonstrated herein, it is possible to generate other achromatic phase retardation values. Hence the device can in practice act as a tunable achromatic phase modulator useful for many applications.

Although having the two retarders oriented with their optics axis normal to each other is the preferable embodiment, other relative orientations between the two retarders are also possible. An important property of the orthogonal orientation case is the fact that it gives the same absolute value of retardation for both x and y but at different signs. Referring to FIG. 1c if the retardation of the wave polarized along x is $\Gamma_1-\Gamma_2$, the retardation for the one polarized along y will be $\Gamma_2-\Gamma_1$. Hence as an achromatic waveplate it can operate for the two orthogonal linear polarizations but not simultaneously.

The orientation of two retarders with optics axis parallel to each other provides total retardation of $\Gamma_2+\Gamma_1$. This relation provides the opportunity to divide each thick retarder into two or more thinner retarders which decreases the response time of the device. Another utilization of this relation is to increase the achromatic region of the device by adding additional retarders to the basic two retarders with parallel orientation according to these basic retarders. As an example, if we add another LC retarder oriented parallel to the first retarder of the previously demonstrated device; the achromatic region will be extended.

Figure 10:
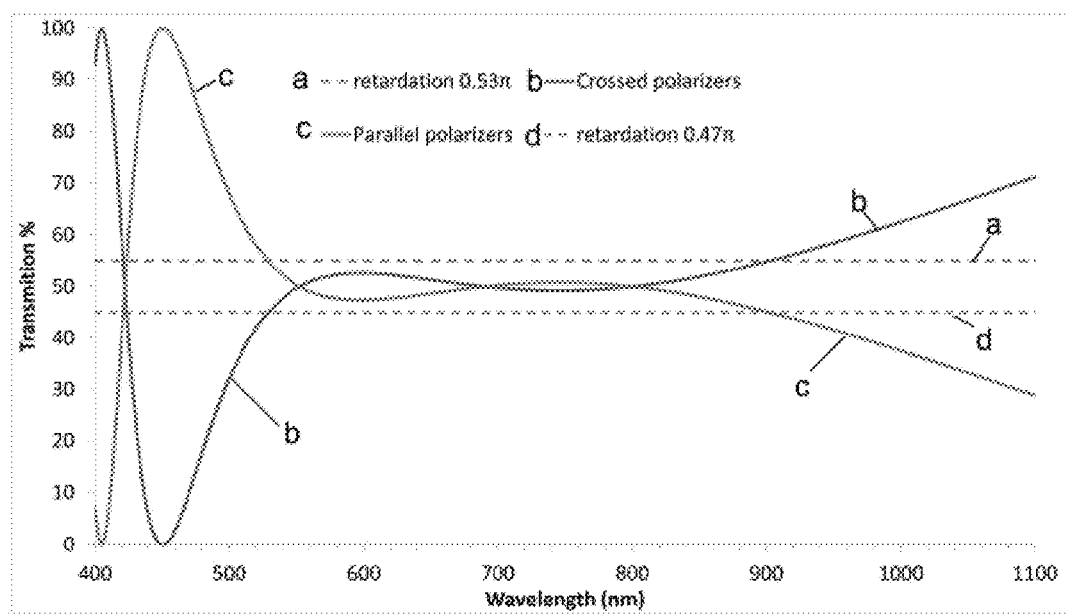
FIG. 10 shows the simulated transmission of an embodiment of the device of the invention between crossed and parallel polarizers for the device of the invention comprising a third ideal nematic retarder.

FIG. 10 shows the results of a simulation of an embodiment of the device of the invention comprising a third ideal nematic LC cell made from Merck BL036 LC material with thickness of 14.69 μm. FIG. 10, which is to be compared with FIG. 3, shows the device operating as an extended AQWP with variation of 5% in transmission (±0.03π in retardation) in the wavelength region of 510-930 nm. The first LC retarder is with tilt angle of $\vartheta=20$ degrees, the second LC retarder with tilt angle of $\vartheta=17.74$ degrees, and the third LC retarder with $\vartheta=27$ degrees.

Other embodiments of the invention use the same concept but with other LC modes or combinations of different LC devices based on different modes such as twisted nematic, vertically aligned, ferroelectric, cholesteric, hybrid aligned, chiral liquid crystals, flexoelectric, dual mode, in-plane and other modes known in the art. Combination of different modes and different LC materials is another important embodiment because it increases the chances to find the voltage combinations that give the desired achromatic range. Ferroelectric liquid crystals (FLCs) are faster devices and their use is important when dynamic control of the achromatic phase is important for example in broadband phase shift interferometry, interference microscopy and optical coherence tomography. Example of such an FLC mode that can give phase only modulation is the one presented by one of the inventors in ref [15], which includes special treatment of the boundaries so that the molecules at the boundaries are fixed.

Alignment layers of the LC devices can also vary, for example nanostructured surfaces such as subwavelength gratings are known to align LCs and at the same time function also as polarizers. Subwavelength gratings have also the special dispersion property of their form birefringence which makes them useful for building passive non-tunable achromatic waveplates. One of the embodiments of this invention is to integrate subwavelength gratings and other nanostructures with form birefringence (examples include metallic gratings with Gaussian profile, glass gratings written with femtosecond lasers, etc.) into the LC devices in order to improve their functionality as tunable AWPs and to also function as alignment layers.

Another embodiment of the device is to have at least one of its individual tunable retarders made of pixels so that an achromatic spatial light modulator (ASLM) is generated. One important option of this embodiment is to have a small number of pixels of rectangular or annular shape in order to generate achromatic phase or amplitude masks used in optical imaging systems for improving the depth of field or the resolution. Another important option is to use such achromatic SLM to change the focus of an optical imaging system without dependence on the wavelength. One important application is as an achromatic phase mask located near the image plane of orthogonal polarization interferometer or interference microscope to give 3 or 4 different phase shifts between the two orthogonal polarizations; hence 3D phase image can be obtained without any scanning.

Another embodiment of the device is one in which the external fields are controlled by light, for example by having at least one of the individual retarders made as an optically addressed spatial light modulator (OASLM). In the OASLM a photosensor layer is used in conjunction with the LC layer so that when light is incident on the photosensor, it changes the voltage drop on the LC layer because of the generated photocurrent or the photoinduced change in the resistivity or capacitance of the photosensor layer. The writing light can then be in a different spectral region or polarization than the light to be modulated and the device can operate in reflection or in transmission modes. Examples of photosensors include crystalline or polycrystalline Si, hydrogenated amorphous Si, lead sulfide, InGaAs photodiodes, PbS, chalcogenide glass thin films and more. Chalcogenide glass has also been shown by the group of one of the inventors to act as a photoalignment layer in addition to its action as a photosensor [16].

Another embodiment of the device is to have it acting as an achromatic switch when operated between two polarizers as demonstrated in FIG. 8 and FIG. 9, which For example shows a case in which switching of the transmission between ON and OFF is achieved over a wideband.

Another embodiment of the device is as a wavelength independent polarization rotator, when the first retarder is acting as a variable retarder while the second retarder is acting as a quarter waveplate (QWP). At the output of this device the vertically incident polarized light will be rotated by half of the retardation of the first cell. It is possible to improve the polarization rotator by having the QWP to be achromatic in which case the number of the active voltage channels is reduced.

Another embodiment of the device is to build an achromatic phase generator for a polarimetric imaging system that generates linear Vertical polarization (V), linear Horizontal polarization (H), Right circular polarization (R) and Left circular polarization (L). This phase generator is composed of two achromatic devices. In embodiments wherein the first device acts as AFWP and the second device act as AQWP, AHWP or AFWP the output of the polarization generator is R, V and H polarization respectively. On the other hand, when the first device acts as AQWP and the second device acts as AHWP, then the output of the phase generator is L polarization.

Although embodiments of the invention have been described by way of illustration, it will be understood that the invention may be carried out with many variations, modifications, and adaptations, without exceeding the scope of the claims.

BIBLIOGRAPHY

1. S. Pancharatnam, Proc. Indian Acad. Sci. 41A, 137-144 (1955).
2. J. B. Masson and G. Gallot, OPTICS LETTERS, Vol. 31, No. 2, (2006).
3. A. Saha, K. Bhattacharya and A. K. Chakraborty, Optical Engineering 50(3), 034004 (2011).
4. A. Saha, K. Bhattacharya and A. K. Chakraborty, Optical Engineering 51(1), 013001 (January 2012).
5. A. Saha, K. Bhattacharya and A. K. Chakraborty, APPLIED OPTICS, Vol. 51, No. 12, (2012).
6. S. Shen, J. She, and T. Tao, J Opt Soc Am. A, Vol. 22, No. 5 (2005).
7. H. Kikuta, Y. Ohira, and K. Iwata, APPLIED OPTICS. Vol. 36, No. 7. (1997).
8. G. P. Nordin and P. C. Deguzman, OPTICS EXPRES, Vol. 5, No. 8, (1999).
9. K. Guo-Guo, T. Qiao-Feng, and J. Guo-Fan, CHIN PHYS LETT, Vol. 26, No. 7 (2009).
10. G. Kang, Q. Tan, X. Wang and G. Jin, OPTICS EXPRESS, Vol. 18, No. 2, (2010).
11. R. M. A. Azzam and C. L. Spinu, J. Opt. Soc. Am A, Vol. 21, No. 10, (2004).
12. I. Abdulhalim, R. Moses and R. Sharon, ACTA PHYSICA POLONICA A, No. 5, Vol. 112 (2007).
13. M. Wahle and H. S. Kitzerow, OPTICS EXPRESS, Vol. 22, No. 1, (2014).
14. I. Abdulhalim and D. Menashe, Liquid Crystals, Vol. 37, No. 2, 233-239 (2010).
15. I. Abdulhalim, Continuous Phase-Only or Amplitude Light Modulation using Ferroelectric Liquid Crystals with Fixed Boundary Orientations, Optic Communi, 108, 219 (1994).
16. Miri Gelbaor Kirzhner, Matvey Klebanov, Victor Lyubin, Neil Collings, and I. Abdulhalim, High resolution optically addressed spatial light modulator based on nematic liquid crystal and nano-dimensional chalcogenide glass photosensor, Optics Letters 39, 2048 (2014).

The invention claimed is:

1. A tunable achromatic wave plate comprising:
   two retarders made of different electrooptic or magnetooptic materials arranged with their optic axes at different azimuthal and tilt angle orientations with respect to each other; and
   at least one voltage source configured to tune a retardation dispersion of each of the retarders by applying an external electric or magnetic field to each retarder separately, the retardation dispersion of each of the retarders compensated by that of the other retarder and vice versa,
   wherein the at least one voltage source provides a first source voltage to tune a first retardation dispersion of a first retarder of the two retarders to a first retardation dispersion and the at least one voltage source also provides a second source voltage to tune a second retardation dispersion of a second retarder of the two retarders to a second retardation dispersion different from the first retardation dispersion of the first retarder,
   wherein said first source voltage and said second source voltage are different non-zero values and said tunable achromatic plate is configured to receive incident light polarized at a certain angle with respect to the optic axis of the first retarder.

2. The tunable achromatic wave plate of claim 1, wherein at least one of the retarders is made of liquid crystal material.

3. The tunable achromatic wave plate of claim 2, wherein the material or mode of the liquid crystal material is chosen from the group comprising: nematic, twisted nematic, vertically aligned, ferroelectric, cholesteric, hybrid aligned, chiral liquid crystals, flexoelectric, dual mode, and in-plane.

4. The tunable achromatic wave plate of claim 1, comprising two different retarders oriented with their optic axis perpendicular to each other, wherein said tunable achromatic wave plate is configured to receive the incident light polarized at 45 degrees to the optic axis of the first retarder.

5. The tunable achromatic wave plate of claim 1, wherein said at least one voltage source is configured to apply said external electric or magnetic field changing the tilt angles of the optic axis of the retarders with respect to each other, thereby tuning the spectral range over which the wave plate operates.

6. The tunable achromatic wave plate of claim 1, wherein the spectral range over which the wave plate operates is tuned by changing the voltage applied to each of the retarders.

7. The tunable achromatic wave plate of claim 1, wherein at least one of the retarders is a liquid crystal device including a subwavelength grating layer deposited on one of its substrates.

8. The tunable achromatic wave plate of claim 1, wherein at least one of the retarders comprises pixels, thereby allowing the tunable achromatic wave plate to operate as an achromatic spatial light modulator.

9. The tunable achromatic wave plate of claim 1, wherein at least one of the retarders is comprises an optically addressed spatial light modulator, thereby allowing the external field to be controlled by light.

10. The tunable achromatic wave plate of claim 1, wherein the tunable achromatic wave plate operates between two polarizers acting as an achromatic intensity switch.

11. The tunable achromatic wave plate of claim 1, wherein the first retardation dispersion of the first retarder is configured to be variable and the second retarder is configured to be tuned to a quarter wave, and wherein said wave plate is configured to rotate vertically incident polarized by half of the first retardation dispersion of the first retarder.

12. An achromatic phase generator for a polarimetric imaging system comprising two tunable achromatic wave plates of claim 1, wherein the first achromatic wave plate is configured to operate as an achromatic full wave plate, the second achromatic wave plate is configured to operate as one of an achromatic quarter, half, or full wave plate, and the output of the phase generator is Right circular polarization, linear Vertical polarization, or linear Horizontal polarization respectively.

13. An achromatic phase generator for a polarimetric imaging system comprising two tunable achromatic wave plates of claim 1, wherein the first achromatic wave plate is configured to operate as an achromatic quarter wave plate, the second achromatic wave plate is configured to operate as an achromatic half wave plate, and the output of the phase generator is Left circular polarization.

14. An achromatic phase generator for a phase shift orthogonally polarized low coherence interferometry system comprising the tunable achromatic waveplate of claim 1 placed after the output of an orthogonally polarized interferometry system to generate achromatic phase shift between two interfering beams of the interferometry system.

15. The tunable achromatic wave plate of claim 1, wherein the first and second retardation dispersions of the first and second retarders are selected to adjust said tunable achromatic plate to operate as a quarter wave plate or full wave plate.

* * * * *